(12) United States Patent
Watanabe et al.

(10) Patent No.: US 6,987,624 B2
(45) Date of Patent: Jan. 17, 2006

(54) FRESNEL LENS SHEET AND REAR PROJECTION SCREEN

(75) Inventors: Hitomu Watanabe, Shinjuku-ku (JP); Makoto Honda, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/651,204

(22) Filed: Aug. 29, 2003

(65) Prior Publication Data

US 2004/0196562 A1 Oct. 7, 2004

(30) Foreign Application Priority Data

Aug. 30, 2002 (JP) ............................. 2002-255078

(51) Int. Cl.
*G02B 3/08* (2006.01)
*G03B 21/60* (2006.01)

(52) U.S. Cl. ..................... 359/742; 359/457; 359/743

(58) Field of Classification Search ............... 359/743, 359/742, 457

See application file for complete search history.

(56) References Cited

U.S. PATENT DOCUMENTS

| 4,755,921 A | 7/1988 | Nelson |
| 5,710,671 A * | 1/1998 | Bichlmaier ................ 359/742 |

FOREIGN PATENT DOCUMENTS

| JP | 60-173533 | 9/1985 |
| JP | 61-208041 | 9/1986 |
| JP | 63-30835 | 2/1988 |
| JP | 63-32528 | 2/1988 |
| JP | 63-139331 | 6/1988 |
| JP | 5-72634 | 3/1993 |

* cited by examiner

*Primary Examiner*—Scott J. Sugarman
(74) *Attorney, Agent, or Firm*—Oliff & Berridge, PLC

(57) ABSTRACT

A Fresnel lens sheet has a light-receiving surface and a light-emitting surface. The light-receiving surface is provided with a plurality of prism groups, each including a plurality of straight or circular prisms. Each of the prisms of the prism groups has a total reflection surface that reflects incident light totally toward a viewing side. The height of the prisms formed in a predetermined specific region in the light-receiving surface of the Fresnel lens sheet is bigger than that of the prisms in another region.

13 Claims, 8 Drawing Sheets

FRESNEL LENS SHEET AND REAR PROJECTION SCREEN

TECHNICAL FIELD

The present invention relates to a Fresnel lens sheet to be used in combination with a rear projection screen for a projection television (PTV), and a transmission screen employing the Fresnel lens sheet. More specifically, the present invention relates to a Fresnel lens sheet suitable for use in a projection television that projects light from behind a screen so that the light falls on the screen at an acute angle to the rear surface of the screen.

BACKGROUND ART

A Fresnel lens sheet 70 shown in FIG. 7 is disclosed in, for example, JP60-173533A and JP61-208041A. As shown in FIG. 7, the Fresnel lens sheet 70 has a light-receiving surface 71 provided with a prism set 72 including a plurality of parallel prisms 73. Each prism 73 has a totally reflecting surface 74 to reflect incoming light totally toward a viewing side.

The Fresnel lens sheet having such construction permits a light source disposed behind the light-receiving surface of the Fresnel lens 70 to project light (images) at an acute angle to the Fresnel lens sheet 70, which enables the forming of a thin projection television receiver.

However, some incident light rays fallen on the rear surface of the Fresnel lens sheet do not fall on the totally reflecting surfaces 74 and are totally reflected by the front surface, i.e., light-emitting surface. Such light rays that are totally reflected by the front surface will be referred to, in some cases, as stray light rays in the following description. If stray light rays are produced, an image looks double, i.e., a double image is displayed or a ghost image appears, and the contrast of the image decreases.

As shown in FIG. 8, when light rays 80 fall on the light-receiving surface 71 of the Fresnel lens sheet 70, the Fresnel lens sheet 70 emits both ideal light rays 80A, and undesired light rays 80B that form a ghost image from the light-emitting surface 75.

In JP62-113131A, an invention for solving the problem resulting from the stray light rays diffuses light rays that do not fall on the totally reflecting surfaces of prisms, namely, stray light rays, to make the ghost image ambiguous.

Although this previously proposed invention is able to make the ghost image formed by the stray light rays ambiguous and faint, the contrast of the image decreases unavoidably because there still exist the diffused stray light rays.

Inventions disclosed in, for example, JP63-139331A, JP63-30835A, JP63-32528A and JP5-72634A, form light-absorbing layers in parts, through which totally reflected light rays (images) do not travel, of a Fresnel lens sheet to absorb stray light rays.

Those previously proposed inventions, however, need to adjust the positional relation between the prism and the light-absorbing layers so that the prisms and the light-receiving layers match precisely with each other. If the prisms and the light-absorbing layers are not formed in correct positional relation, it is possible that light rays (images) that must reach the viewer are absorbed. Thus, it is practically very difficult to manufacture Fresnel lens sheets of those previously disclosed inventions. Moreover, even among those previously disclosed inventions, some produce stray light rays and hence effective light rays are reduced accordingly.

DISCLOSURE OF THE INVENTION

The present invention has been made in view of the foregoing problems and it is therefore a principal object of the present invention to provide a Fresnel lens sheet capable of preventing the generation of stray light rays instead of coping with generated stray light rays. Another object of the present invention is to provide a rear transmission screen employing the same Fresnel lens sheet.

A Fresnel lens sheet according to the present invention having a light-receiving surface on which light emitted by a light source falls, and a light-emitting surface from which the light emitted by the light source is emitted comprises a plurality of prism groups each including a plurality of prisms each having a totally reflecting surface that reflects incident light totally toward the light-emitting surface; wherein the light-receiving surface on the side of the light source is divided into a predetermined specific region, and another region, and the prisms in the predetermined specific region have a height bigger than that of the prisms in another region.

The undesirable stray light rays that cause problems are generated when some of incident light rays do not fall on the totally reflecting surfaces. Generation of stray light rays is dependent on the relation between incidence angle at which light rays emitted by the light source fall on the prisms, and totally reflecting surfaces. Therefore, stray light rays are not generated by all the prisms of the prism groups on the light-receiving surface of a single Fresnel lens sheet. Generation of stray light rays is dependent on the positional relation between the light source and the Fresnel lens sheet, i.e., on the incidence angle of the light ray, and stray light rays are generated only in a specific part of the Fresnel lens sheet.

In the Fresnel lens sheet of the present invention, the prisms in the specific region in which stray light rays are generated are formed in a height bigger than that of the prisms in another region to prevent the generation of stray light rays. Light rays, which would fall on the prisms of a smaller height formed in another region further from the light source than the prisms of the bigger height formed in the specific region if the height of the prisms in the specific region is equal to that of the former prisms, fall on the prisms of the bigger height in the specific region. Consequently, all the light rays are reflected by all the totally reflecting surfaces of the prisms.

In the Fresnel lens sheet according to the present invention, the prisms in the specific regions have a width smaller than that of the prisms in the other regions.

A Fresnel lens sheet according to the present invention having a light-receiving surface on which light emitted by a light source falls, and a light-emitting surface from which the light emitted by the light source is emitted comprises a plurality of prism groups each including a plurality of prisms each having a totally reflecting surface that reflects incident light totally toward the light-emitting surface; wherein the light-receiving surface on the side of the light source is divided into a predetermined specific region and another region, and the prisms in the predetermined specific regions have a width smaller than that of the prisms in the another regions.

The Fresnel lens sheet having the prisms formed in the specific region and having the width smaller than that of the prisms formed in another region is capable of preventing the generation of stray light rays. Light rays, which would fall on the prisms having the bigger width and formed in another region further from the light source than the prisms having the smaller width and formed in the specific region and become stray light rays if the width of the prisms in the specific region is equal to that of the former prism, fall on the prism having the smaller width and formed in the specific region because the prisms in the specific region are formed at pitches smaller than those of the prisms in another region. Consequently, all the light rays are reflected by all the totally reflecting surfaces of the prisms.

In the Fresnel lens sheet according to the present invention, light rays emitted by the light source fall on the specific regions of the light-receiving surface at incidence angles in the range of 35° to 45°.

In the specific region, in which the light rays fall at incidence angles in the range of 35° to 45°, of the light-receiving surface of the Fresnel lens sheet, it is likely that stray light rays are generated. Therefore, the generation of stray light rays can be efficiently prevented by forming the prisms in the specific region in the height bigger than that of the prisms in another region or in a width smaller than that of the prisms in another region.

In the Fresnel lens sheet according to the present invention, the height of the prisms nearer to the light source among those formed in the specific region is bigger than that of the prisms farther from the light source among those formed in the specific region.

This Fresnel lens sheet of the present invention is capable of surely preventing the generation of stray light rays.

In the Fresnel lens sheet according to the present invention, the width of the prisms nearer to the light source among those formed in the specific region is smaller than that of the prisms farther from the light source among those formed in the specific region.

This Fresnel lens sheet of the present invention is capable of surely preventing the generation of stray light rays.

In the Fresnel lens sheet according to the present invention, the prisms have the same apex angle.

A rear projection screen according to the present invention comprises a Fresnel lens sheet having a light-receiving surface on which light emitted by a light source falls, and a light-emitting surface from which the light emitted by the light source is emitted; wherein a plurality of prism groups each including a plurality of prisms each having a totally reflecting surface that reflects incident light totally toward the light-emitting surface are formed in the light-receiving surface, the light-receiving surface on the side of the light source is divided into a predetermined specific region, and another region, and the prisms in the predetermined specific region have a height bigger than that of the prisms in another region.

A rear projection screen according to the present invention comprises a Fresnel lens sheet having a light-receiving surface on which light emitted by a light source falls, and a light-emitting surface from which the light emitted by the light source is emitted; wherein a plurality of prisms are formed in the light-receiving surface, each of the prisms has a totally reflecting surface that reflects incident light totally toward the light-emitting surface, the light-receiving surface is divided into a predetermined specific region nearer to the light source, and another region, and the prisms in the specific region have a width smaller than that of the prisms in another region.

The Fresnel lens sheet of the rear projection screen of the present invention prevents the generation of stray light rays. Consequently, any double image is not displayed or any ghost image does not appear, and the rear projection screen displays images in a high contrast.

BEST MODE FOR CARRYING OUT THE INVENTION

Fresnel lens sheets according to the present invention and rear projection screens provided with the same Fresnel lens sheets will be described with reference to the accompanying drawings.

Figure 1:
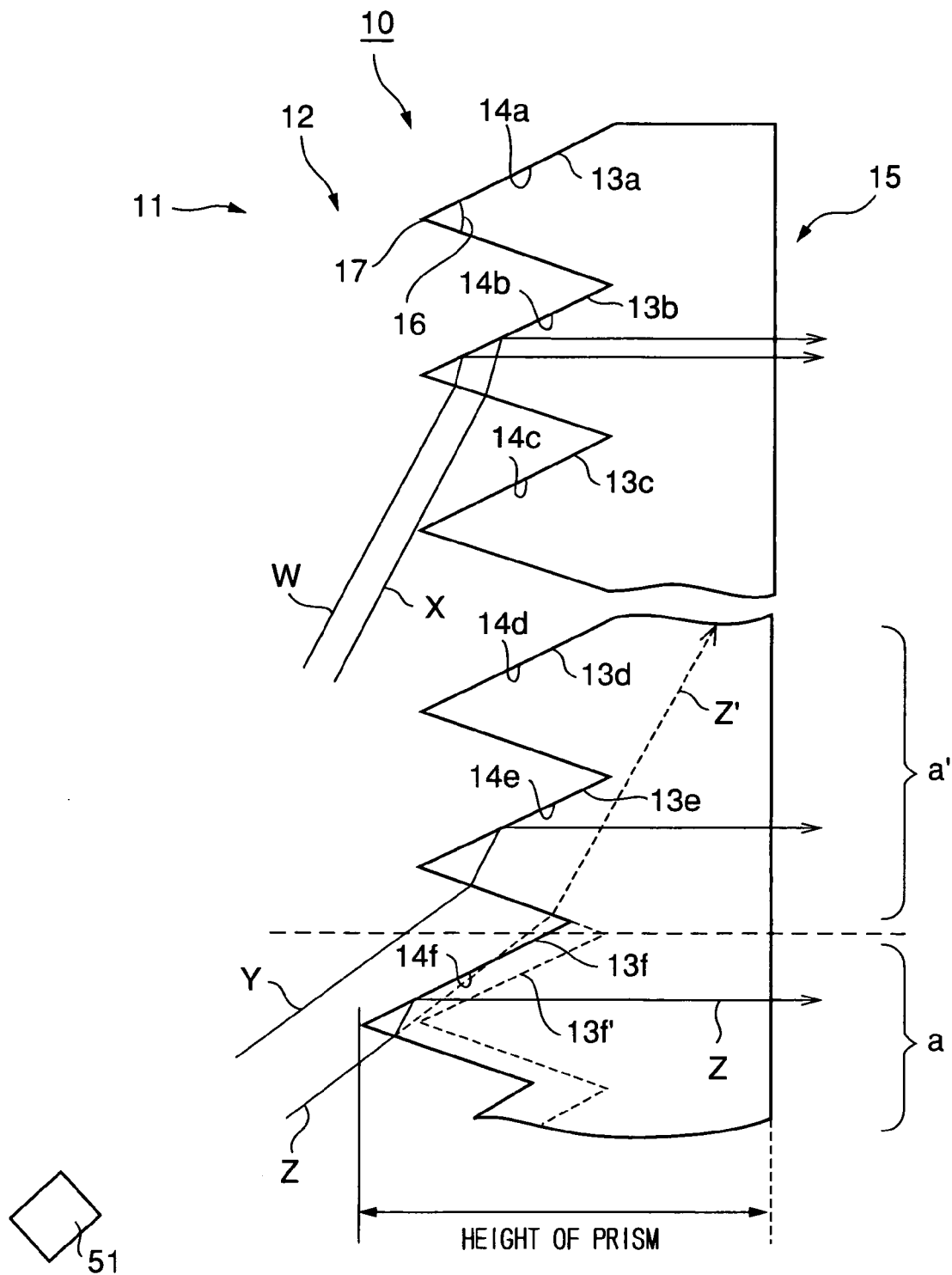
FIG. 1 is a cross-sectional view of a Fresnel lens sheet in a first embodiment according to the present invention.

FIG. 1 is a cross-sectional view of a Fresnel lens sheet in a first embodiment according to the present invention.

A Fresnel lens sheet 10 shown in FIG. 1 has a light-receiving surface 11 and a light-emitting surface 15. Light rays emitted by a light source 51 fall on the light-receiving surface 11 and emerge from the light-emitting surface 15. The light-receiving surface 11 of the Fresnel lens sheet 10 is provided with a plurality of prism groups 12. Individual prisms 13a to 13f have totally reflecting surfaces 14a to 14f capable of totally reflecting incident light rays toward a viewing side. The apex angles 16 of the prisms 13a to 13f are substantially the same. In the Fresnel lens sheet 10, the prism in a predetermined specific region a of the light-receiving surface 11 nearer to the light source 51, i.e., the prism 13f, has a height bigger than that of the other prisms 13a to 13e in the other region a'.

As shown in FIG. 1, the height of each of the prisms 13a to 13f corresponds to the distance between the apex 17 of the prism and the light-emitting surface 15 of the Fresnel lens sheet 10.

A prism 13f' indicated by broken lines in the specific region a is an imaginary prism having a height equal to that of the prisms 13a to 13e in the other region a' and shown to facilitate understanding the feature of the present invention.

The stray light preventing capability of the Fresnel lens sheet 10 will be described.

Suppose that the light source 51 is disposed in a lower part in FIG. 1.

Light rays W and X fall on, for example, the prism 13b farther from the light source 51 at a large incidence angle to the light-receiving surface 11 of the Fresnel lens sheet 10, and hence the incident light rays W and X fallen on the prism 13b reach the totally reflecting surface 14b and are reflected toward the viewing side. Consequently, any stray light rays are not generated.

Suppose that all the prisms 13a to 13f have the same height, and the imaginary prism 13f' indicated by broken lines is nearer to the light source 51. Light rays Y and Z fall on the Fresnel lens sheet 10 at a comparatively small incidence angle. Whereas the light ray Y farther from the apex 17 of the prism 13*f* nearer to the light source 51 and adjacent to the prism 13*e* falls on the prism 13*e* and is reflected toward the viewing side by the totally reflecting surface 14*e* of the prism 13*e*, the light ray Z passing the vicinity of the apex 17 the prism 13*f* nearer to the light source 51 and adjacent to the prism 13*e* is unable to reach the totally reflecting surface 14*e* of the prism 13*e* and becomes a stray light ray Z'.

In the Fresnel lens sheet 10 of the present invention, the prism 13*f* in the specific region a is formed in a height bigger than that of the other prisms 13*a* to 13*e*. Therefore, the light ray Z, which would otherwise become the stray light ray Z', fall on the prism 13*f* nearer to the light source 51 than the prism 13*e* and adjacent to the prism 13*e*. Consequently, the light ray Z is reflected toward the viewing side by the totally reflecting surface 14*f* of the prism 13*f*. Thus, the Fresnel lens sheet 10 of the present invention does not generate any stray light rays.

Thus, the Fresnel lens sheet 10 can make the light ray Z, which otherwise would become the stray light ray Z', fall on the specific prism nearer to the light source formed in a height bigger than that of the prism farther from the light source than the specific prism to prevent the generation of stray light rays.

A description of what is the specific region a in the Fresnel lens sheet 10 in the first embodiment and what is the height of the specific prism in the specific region a will be given afterward.

Figure 2:
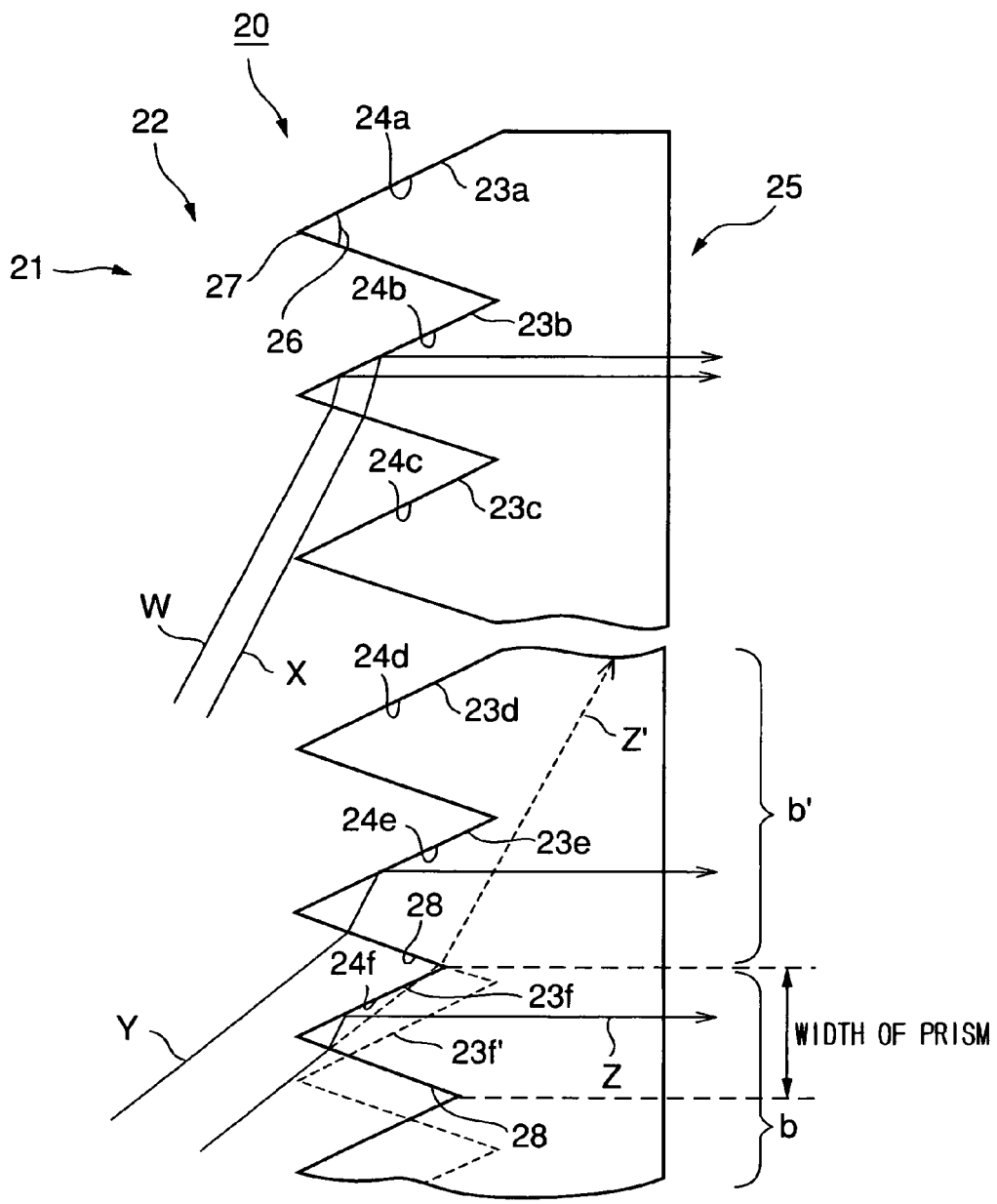
FIG. 2 is a cross-sectional view of a Fresnel lens sheet in a second embodiment according to the present invention.
Figure 2:
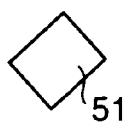

FIG. 2 is a cross-sectional view of a Fresnel lens sheet in a second embodiment according to the present invention.

The Fresnel lens sheet 20 shown in FIG. 2, similarly to the Fresnel lens 10 shown in FIG. 1, has a light-receiving surface 21 and a light-emitting surface 25. The light-receiving surface 21 of the Fresnel lens sheet 20 is provided with prism groups 22.

Individual prisms 23*a* to 23*f* of the prism groups 22 have totally reflecting surfaces 24*a* to 24*f* capable of totally reflecting incident light rays toward a viewing side. In the Fresnel lens sheet 20, a specific prism in a predetermined specific region b of the light-receiving surface 21 nearer to a light source 51, i.e., the prism 23*f*, has a width smaller than that of the other prisms 23*a* to 23*e* in the other region b'. The prisms of the Fresnel lens sheet 20 shown in FIG. 2 have apices 27. The prisms 23*a* to 23*f* have substantially the same apex angle 26.

As shown in FIG. 2, the width of each of the prisms 23*a* to 23*f* corresponds to the distance between the adjacent roots 28 of the prisms of the Fresnel lens sheet 20. Basically, the width of the prism corresponds to the pitches of the apices 27 of the prisms 23*a* to 23*f*.

A prism 23*f'* indicated by broken lines in the specific region b is an imaginary prism having a width equal to that of the prisms 23*a* to 23*e* in the other region b' and shown to facilitate understanding the feature of the present invention.

The stray light preventing capability of the Fresnel lens sheet 20 will be described.

Suppose that the light source 51, similarly to the light source 51 shown in FIG. 1, is disposed in a lower part in FIG. 2.

Light rays W and X, similarly to those mentioned in the previous description made in connection with FIG. 1, fall on, for example, the prism 23*b* farther from the light source 51 at a large incidence angle to the light-receiving surface 21 of the Fresnel lens sheet 10, and hence the incident light rays W and X fallen on the prism 13*b* reach the totally reflecting surface 14*b* and are reflected toward the viewing side. Consequently, any stray light rays are not generated.

As regards light rays falling on the prism 23*e* near the light source 51, a stray light ray Z' would be generated as mentioned in the description made in connection with FIG. 1 if the Fresnel lens sheet 20 is the same in construction as the conventional Fresnel lens sheet.

In the Fresnel lens sheet 20 of the present invention, the prism 23*f* in the specific region b is formed in a width smaller than that of the other prisms 23*a* to 23*e* in the other region b'. Therefore, the light ray Z, which would otherwise become the stray light ray Z', falls on the prism 23*f* nearer to the light source 51 than the prism 23*e* and adjacent to the prism 23*e*. Consequently, the light ray Z is reflected toward the viewing side by the totally reflecting surface 24*f* of the prism 23*f*. Thus, the Fresnel lens sheet 20 of the present invention does not generate any stray light rays.

Thus, the Fresnel lens sheet 20 can make the light ray Z, which otherwise would become the stray light ray Z', fall on the specific prism 23*f* nearer to the light source 51 by forming the specific prism 23*f* in a small width, i.e., by arranging the prisms at small pitches, to prevent the generation of stray light rays.

To sum up, as obvious from the foregoing description, the Fresnel lens sheet 10 in the first embodiment (the Fresnel lens sheet 20 in the second embodiment) of the present invention forms the specific prism 13*f* (23*f*) nearer to the light source 51 than the prism 13*e* (23*e*) in a height bigger than that of the adjacent prism 13*e* (in a width smaller than that of the adjacent prism 23*e*), which can make the light ray Z that is unable to reach the totally reflecting surface 14*e* (24*e*) fall on the specific prism 13*f* (23*f*) and be reflected from the totally reflecting surface 14*e* (24*e*) to prevent the generation of the stray light ray Z'.

The respective heights and widths of the prisms in the regions a and b, and the pitches of the prisms of the Fresnel lens sheets of the present invention will be described.

Figure 3:
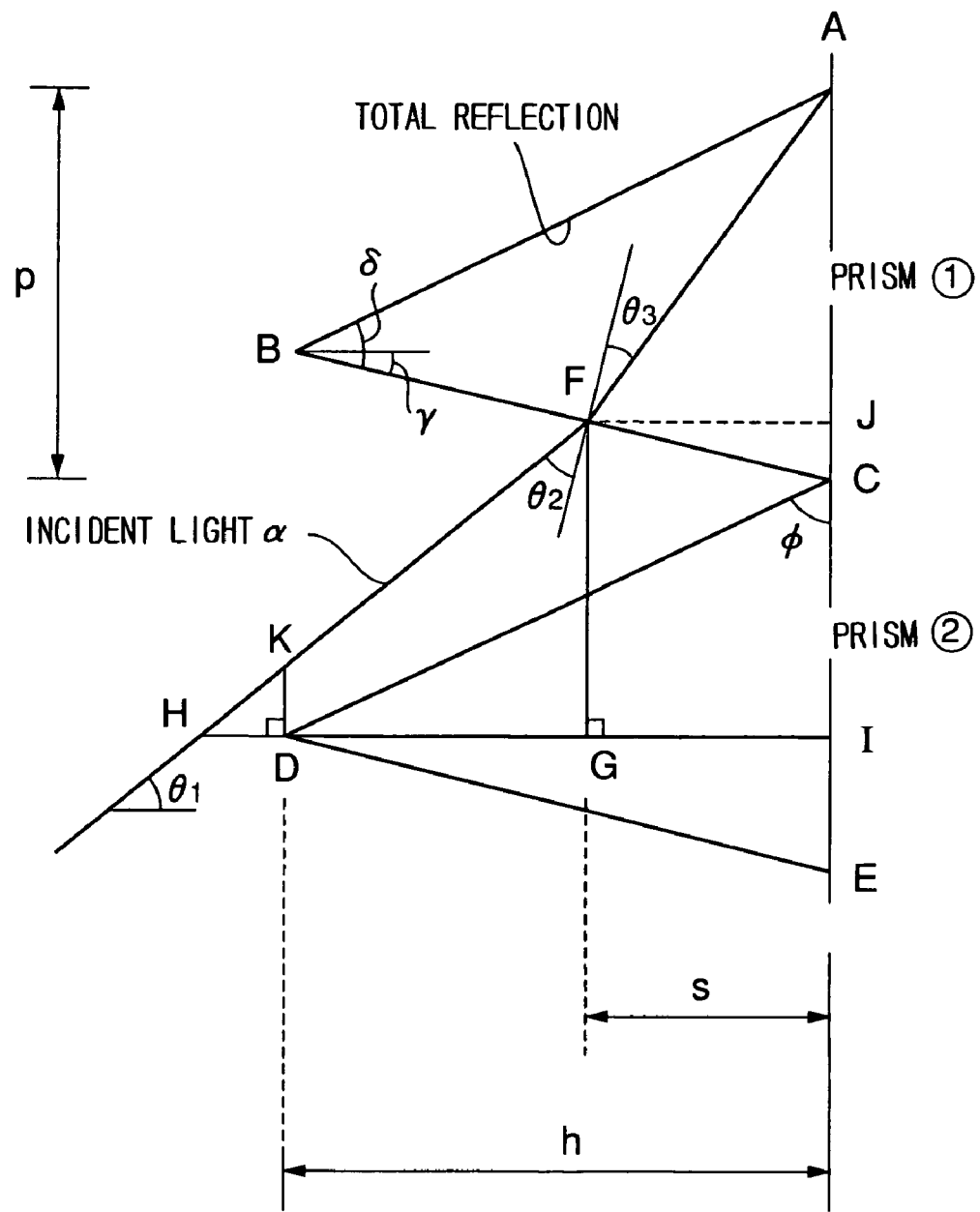
FIG. 3 is an enlarged cross sectional view of prisms at the boundary of a specific region in a Fresnel lens sheet according to the present invention.

FIG. 3 is an enlarged cross-sectional view of prisms at the boundary of the specific region a.

Referring to FIG. 3, a prism ① lies outside the specific region a and a prism ② lies in the specific region a. The height or the width of the prism ② necessary to prevent the generation of stray light rays by the prism ① will be explained.

Suppose that light falls on the prism ① at an incidence angle $\theta_1$. Then, a light ray α is a boundary light ray that can be reflected by the totally reflecting surface of the prism ①. Light rays on the side of the prism ② with respect to the light ray α, namely, light rays that cross line segments HD and KD, are unable to reach the totally reflecting surface of the prism ① and become stray light rays.

Therefore, the Fresnel lens sheet of the present invention has to make the light rays that cross the line segments HD and KD fall on the prism ①. In order to achieve this purpose, in the first embodiment, the prism ② nearer to the light source has a height bigger than that of the prism ① by a value corresponding to the length of the line segment HD. In the second embodiment, the width of the prism ① is decreased by a value corresponding to the length of the line segment KD, i.e., the prism ② is shifted such that the apex of the prism ② coincides with the point K and the pitch between the apices of the prisms ① and ② is decreased by a value corresponding to the length of the line segment KD. The first and the second methods do not need necessarily to be carried out individually. A third method may increase the height of the prism ②  and decrease the width of the prism ① such that the apex of the prism ② is on a line segment HK.

The lengths of the line segments are calculated by using the following expressions.

The line segment HD is calculated by subtracting h from the line segment HI. h is calculated by the following expression (1).

$$h = \frac{\tan\phi \cdot \tan(\pi - \phi - \delta)}{\tan\phi + \tan(\pi - \phi - \delta)} P \quad (1)$$

The length of a line segment HI is the sum of those of line segments HG and GI. A triangle $\Delta$AFC is used to calculate the length s of the line segment GI. Since an angle $\angle$FAC=$\gamma$+$\theta_3$, the length s of the line segment GI is calculated by using Expression (2).

$$GI = S = \frac{\tan(\pi - \phi - \delta) \cdot \tan(\gamma + \theta_3)}{\tan(\pi - \phi - \delta) + \tan(\gamma + \theta_3)} P \quad (2)$$

Expression (3) is developed from a triangle $\Delta$HGF.

$$HG = FG \cdot \tan(\gamma + \theta_2) = (JC + CI) \cdot \tan(\gamma + \theta_2) \quad (3)$$

The respective lengths of line segments JC and CI are calculated by using Expressions (4) and (5).

$$JC = \frac{\tan(\theta_3 + \gamma)}{\tan(\theta_3 + \gamma) + \tan(\pi - \phi - \delta)} P \quad (4)$$

$$CI = \frac{\tan(\pi - \phi - \delta)}{\tan\phi + \tan(\pi - \phi - \delta)} P \quad (5)$$

where $\gamma = \theta_1 - \phi - \pi/2$, $\theta_2 = \pi - \theta_1 - \phi - \delta$, and $\theta_3 = \sin^{-1}\{\sin(\theta_2/n)\}$.

The length of the line segment HG can be calculated by substituting Expressions (4) and (5) into Expression (3). The length of the line segment HG can be obtained by subtracting h calculated by using Expression (1) from the sum of Expressions (2) and (3).

$$HD = HG + GI - h \quad (6)$$

Since triangles $\Delta$HGF and $\Delta$HDK are similar triangles, the length of the line segment KD can be calculated by using Expression (7).

$$\frac{KD}{HD} = \frac{FG}{HG} \quad (7)$$

The height and width of the prism ②, which are the features of the present invention, explained above in connection with FIG. 3 and the expressions are calculated on the basis of the dimensions of the prism ① at the boundary of the specific region a. Therefore, the dimensions of a prism ③ nearer to the light source than the prism ② can be calculated on the basis of the dimensions of the prism ②. Referring to FIG. 3, the height and width of the prism ② may be calculated on the basis of the height and width of the prism ①, and the height and width of the prism ③ may be calculated on the basis of the height of the prism ②. When the respective heights and widths of the prisms in the specific region a are thus calculated sequentially, the heights of the successive prisms in the specific region a increase gradually toward the light source, or the widths of the successive prisms in the specific region a decrease gradually toward the light source. A Fresnel lens sheet provided with such prisms also conforms to the present invention.

The specific regions a and b in the Fresnel lens sheet of the present invention will be described. As mentioned above in connection with FIGS. 1 and 2, the specific regions a and b are those that are possible to generate stray light rays. The position of a specific region that generates stray light rays is dependent on the positional relation between the light source and the Fresnel lens sheet, and the shapes of the prisms formed in the light-receiving surface of the Fresnel lens sheet. The specific region is a part of the light-receiving surface of the Fresnel lens sheet on the side of the light source, on which light rays fall at comparatively small incidence angles.

Figure 4:
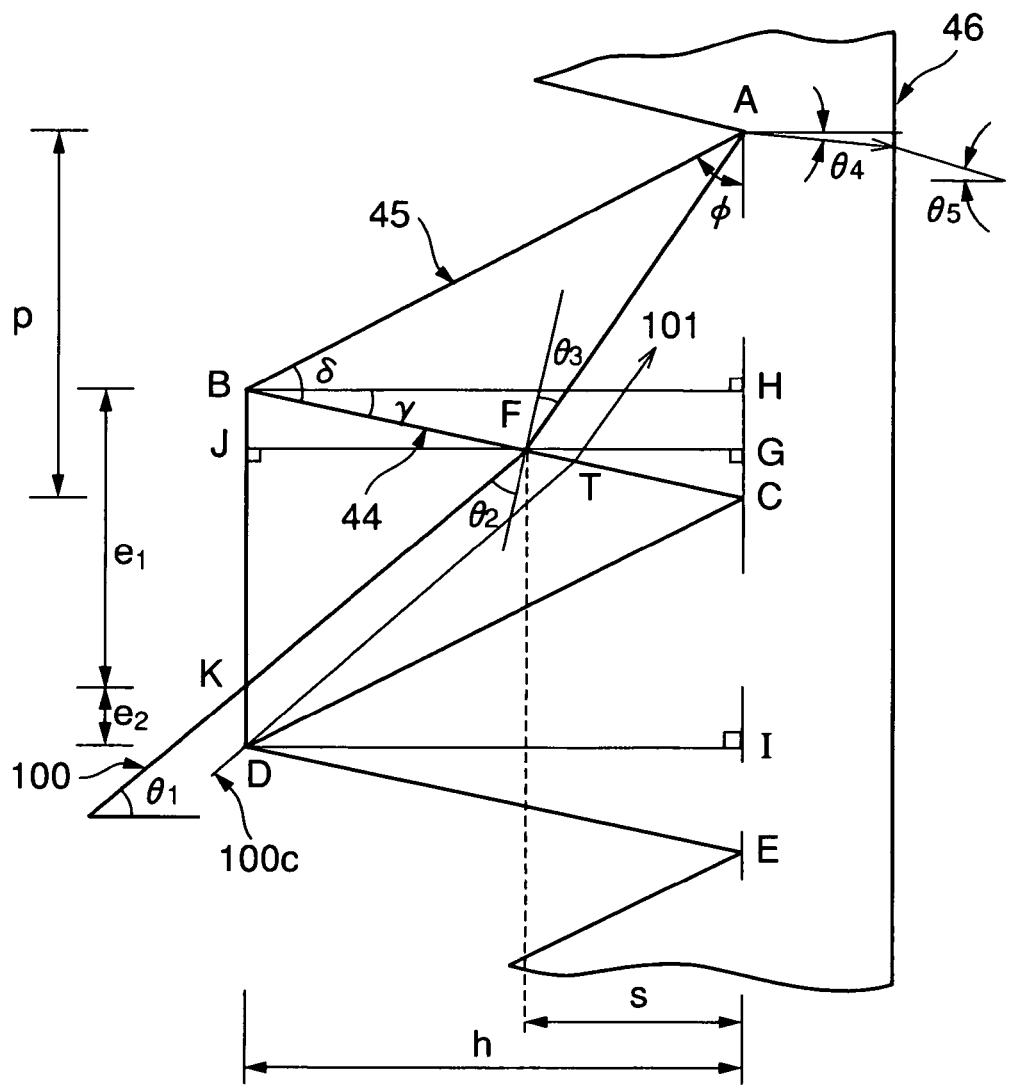
FIG. 4 is a view of assistance in explaining the specific region in a Fresnel lens sheet according to the present invention.

The specific regions a and b are dependent on the apex angle and refractive index of the prisms. Therefore, the specific regions a and b can be determined through optical design, which will be described with reference to FIG. 4. Referring to FIG. 4, the Fresnel lens angle $\phi$ of a totally reflecting Fresnel lens employed in the present invention is expressed by Expression (8)

$$\tan\phi = \frac{(n \times \sin(\delta + \theta_4) + \sin(\delta + \theta_1))}{(n \times \cos(\delta + \theta_4) - \cos(\delta + \theta_1))} \quad (8)$$

where $\theta_1$ is an incidence angle, n is the refractive index of a material forming the Fresnel lens, $\theta_4$ is an angle between an image light ray reflected by a second surface of a prism and a normal to the light-emitting surface of the Fresnel lens sheet, and $\delta$ is the apex angle of the prism.

Suppose that the light-emitting surface 46 on the viewing side is flat. Then, the relation between the angle $\theta_4$ and an angle $\theta_5$ between an outgoing light ray and a normal to the light-emitting surface of the Fresnel lens sheet is expressed by Expression (9) provided that $\gamma = \phi + \delta - \pi/2 \geq 0$.

$$\sin \theta_4 = \sin \theta_5 / n \quad (9)$$

If the angle $\gamma$ is negative, a first surface 44 of the prism inclines in the opposite direction, and therefore it is practically impossible to form the Fresnel lens sheet and a mold for molding the Fresnel lens sheet. Thus in a part where $\gamma < 0$, the first surface 44 of the prism is formed perpendicularly, the apex angle $\gamma$ is changed and the Fresnel lens angle $\phi$ is determined. The Fresnel lens angle $\phi$ can be calculated by using Expression (10).

$$\phi = \{\arcsin(\cos \theta_1 / n) + \theta_4 + \pi/2\}/2 \quad (10)$$

The boundary between the specific region having a part that generates a stray light ray, and the other region not having any part that generates stray light rays will be explained in connection with an image light ray 100 that falls on the first surface 44, and is diffracted so as to travel toward a root A. Suppose that the image light ray 100 falls on the first surface 44 of the prism at an incidence angle $\theta_1$ and is refracted at an angle $\theta_3$ of refraction by the first surface 44. Then, the width e1 of an effective region B-K, through which light rays traveled can be totally reflected by the second surface 45 of the prism, is expressed by Expression (11).

$$e_1 = (h-s) \times (\tan\gamma + \tan\theta_1) \quad (11)$$
$$= (h-s) \times (\tan(\phi + \delta - \pi/2) + \tan\theta_1)$$

where p is the pitches of the prisms of the Fresnel lens sheet, e2 is the width of a region K-D, through which light rays traveled cannot be totally reflected by the second surface 45 of the prism, h is the height of the prisms, and s is the height of the boundary between an effective part, on which light rays fallen do not become stray light rays, of the first surface 44 of the prism, and an ineffective part, on which light rays fallen become stray light rays of the first surface 44.

The height h of the prisms and the height s of the boundary between the effective and the ineffective part of the first surface 44 are expressed by Expressions (12) and (13).

$$h = p \times \tan(\phi+\delta) \times \tan\phi / (\tan(\phi+\delta) - \tan\delta) \quad (12)$$

$$s = -P \times \tan(\phi+\delta)/(1+\tan(\phi+\delta) \times \tan(\phi+\delta+\theta_3)) \quad (13)$$

The angle $\theta_3$ is expressed by:

$$\theta_3 = \arcsin[\sin(\theta_1 + \phi + \delta)/n] \quad (14)$$

As shown in FIG. 4, $P = e_1 + e_2$ and hence, obviously, $e_1 \leq P$. The effective part ratio $e_1/P$ increases with the increase of the incidence angle $\theta_1$, and $e_1 = P$ for some incidence angle. In regions where incidence angles are greater than the incidence angle $\theta_1$ that makes $e_1 = P$, none of the light ray falling on the first surface 44 becomes a stray light ray.

The position of the boundary between a part that makes an incident light ray become a stray light ray and a part that makes an incident light ray become an effective light ray will be described, in one prism in a region including a part that makes incident light rays become stray light rays with reference to FIG. 4. As previously explained, an image light ray 100 falls on the first surface 44 and is diffracted by the first surface 44 toward the root A of the prism. Although an image light ray 100C parallel to the image light ray 100 and grazing the apex D of the prism falls on the first surface 44, the image light ray 100C cannot be totally reflected by the second surface 45 and becomes a stray light ray 101. Light rays falling on a part F-T in a part B-C, i.e., the first surface 44, become stray light rays. Light rays falling on a part B-F in the part B-C, i.e., the first surface 44 become effective light rays. Any image light rays do not fall in a part T-C.

Figure 5:
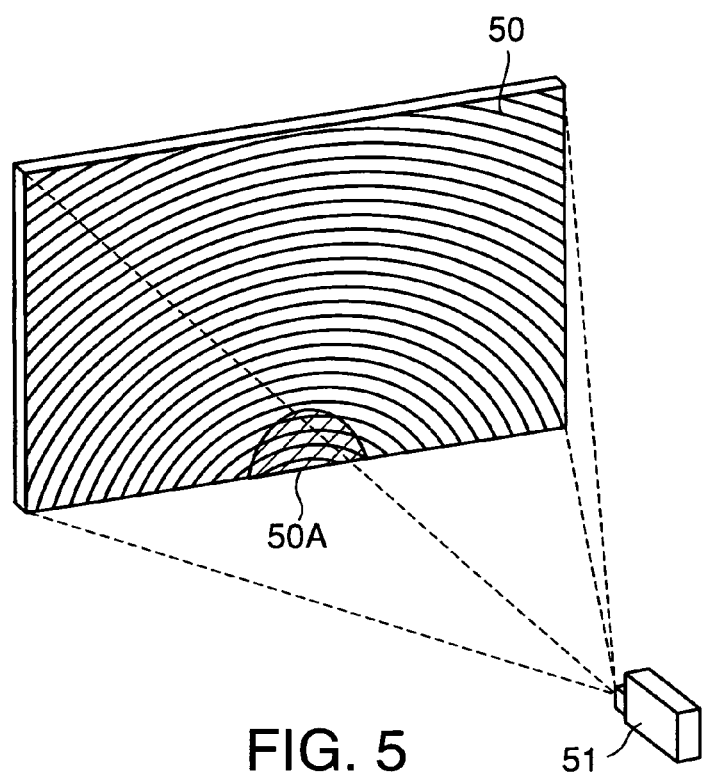
FIG. 5 is a schematic perspective view of a Fresnel lens sheet in a general mode of use.

FIG. 5 is a schematic perspective view of a Fresnel lens sheet in a general mode of use. When a light source 51, such as a projector, and a Fresnel lens sheet 50 are disposed in a positional relation as shown in FIG. 5, light rays emitted by the light source 51 fall on a region 50 A, the nearest to the light source 51 at comparatively small incidence angles, and hence the region 50 A is a specific region. Light rays are liable to become stray light rays when the angles of the light rays to the light-receiving surface of the Fresnel lens sheet (refer to angle $\theta_1$ in FIG. 3) are in the range of 35° to 45°. A region on which light rays fall at such angles to the light-receiving surface may be referred to, as a predetermined specific region.

As obvious from FIG. 5, usually, the region that causes stray light rays of the Fresnel lens sheet 50 is a very narrow region. Therefore, the influence of the gradual increase of the height of the prisms in the specific region on the thickness of the Fresnel lens sheet, is insignificant.

There are not particular restrictions on the material and the method of manufacturing the Fresnel lens sheet of the present invention. The Fresnel lens sheet of the present invention may be formed of a known material and may be manufactured by a known manufacturing method.

For example, materials suitable for forming the Fresnel lens sheet of the present invention are transparent plastic materials, such as acrylic resins, styrene resins, polycarbonate resins, polyester resins, urethane resins, and copolymers of some of those resins. The Fresnel lens sheet of the present invention may be manufactured by a UV molding process, a press molding process, a thermal polymerization process or an injection molding process.

Figure 6:
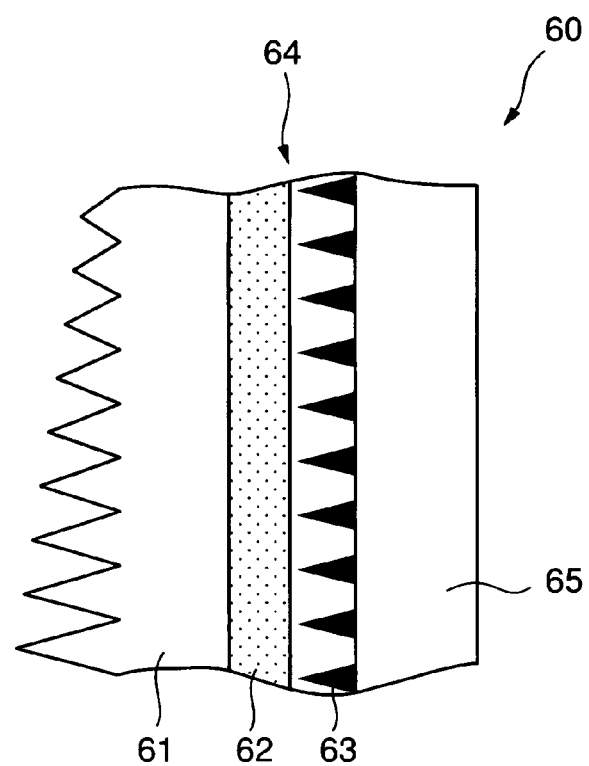
FIG. 6 is a sectional view of a rear projection screen according to the present invention.
Figure 7:
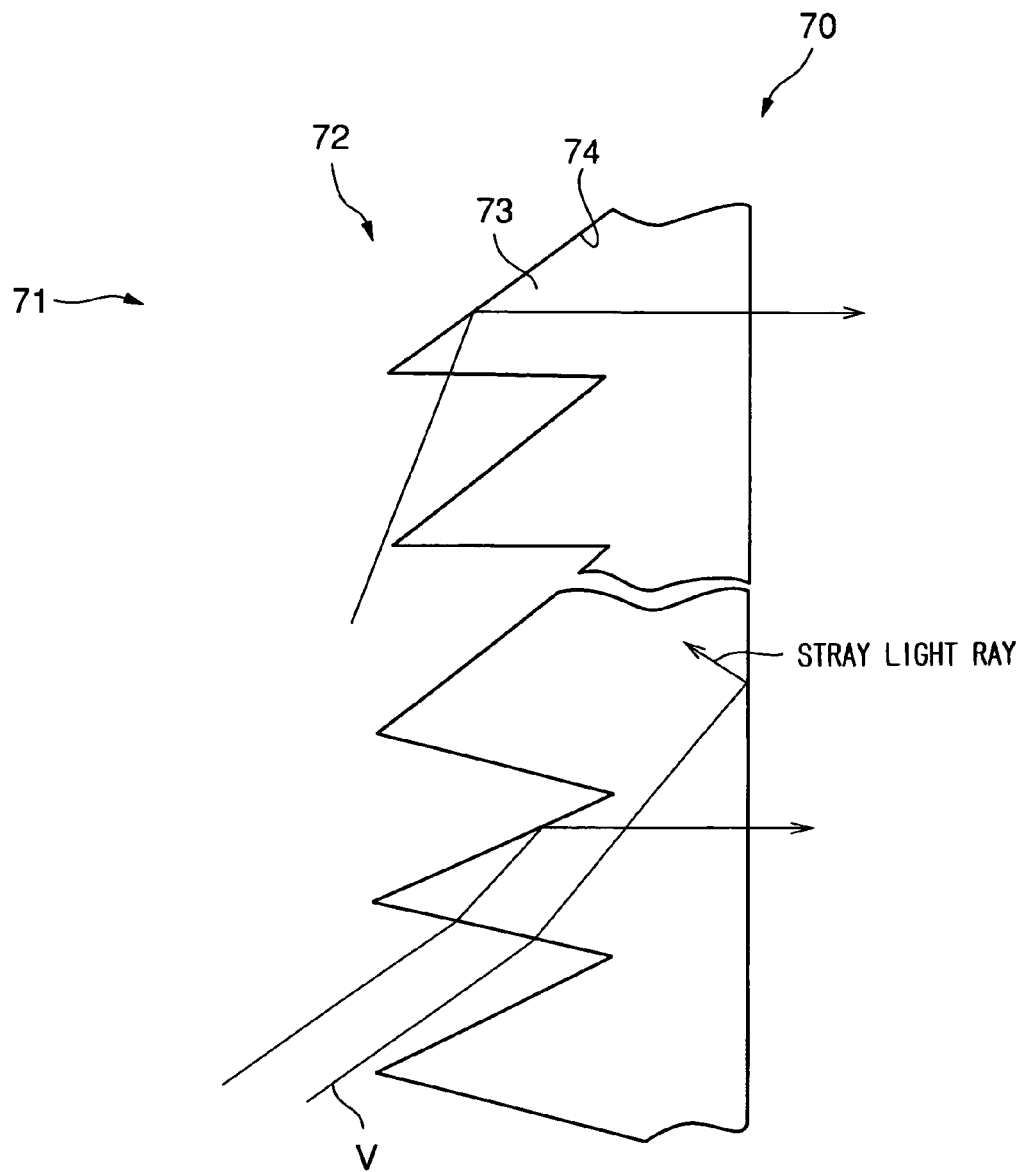
FIG. 7 is a cross-sectional view of a conventional Fresnel lens sheet.
Figure 8:
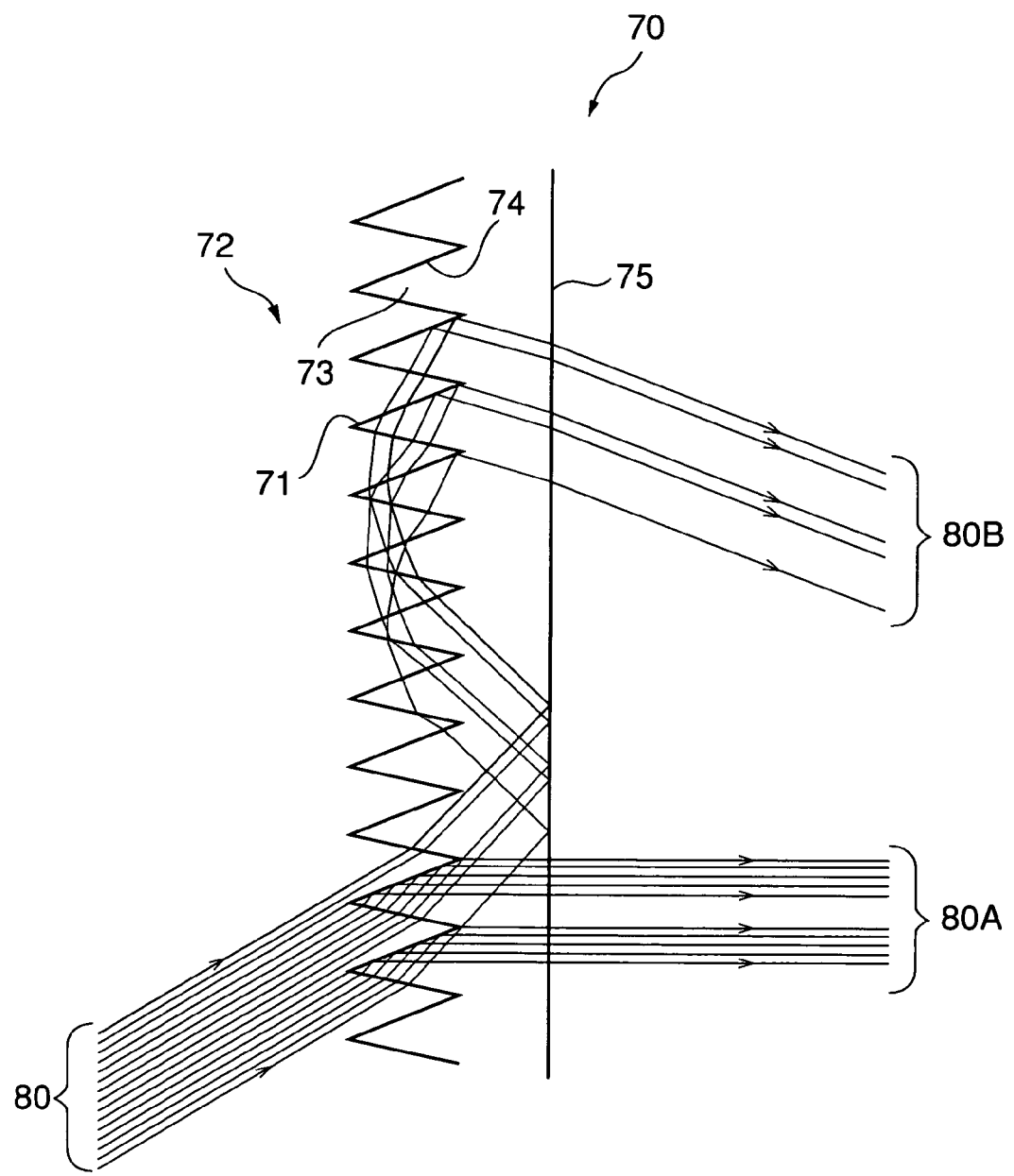
FIG. 8 is a view of assistance in explaining the principle of generation of stray light rays.

FIG. 6 is a sectional view of a rear projection screen according to the present invention provided with a Fresnel lens sheet according to the present invention.

Referring to FIG. 6, a rear projection screen 60 of the present invention may comprise a Fresnel lens sheet 61 of the present invention, a lenticular lens sheet 64 having a diffusing layer 62 and a light-absorbing layer 63, and a front panel 65.

Figure 9:
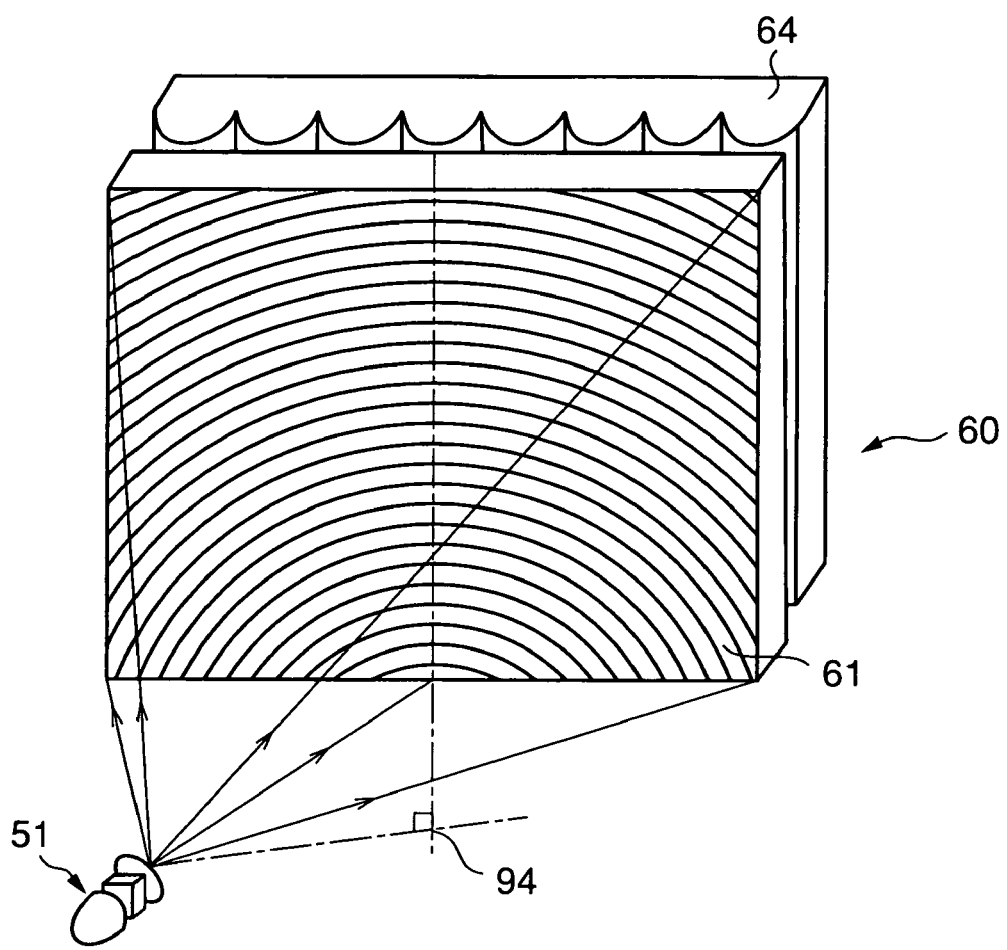
FIG. 9 is a perspective view of another rear projection screen according to the present invention.

Referring to FIG. 9, another rear projection screen 60 may comprise a Fresnel lens sheet 61 of the present invention, and a lenticular lens sheet 64 separated from the Fresnel lens sheet 61. Light projected by a light source 51 toward this rear projection screen 60 falls on the Fresnel lens sheet 61.

The light-emitting surface of the Fresnel lens sheet 61 shown in FIG. 9 does not need necessarily be a flat surface, and may be a surface provided with Vertical diffusion lenticules or prisms.

Fresnel lens sheets in examples will be described.

EXAMPLE 1

A rear projection television screen having a size of 55" (16:9) was fabricated. A light source was disposed at a projection distance of 340 mm at a level 280 mm below the level of the lower end of the rear projection television screen to form a TV set. The incidence angle of light at the middle of the lower end of the rear projection television screen was 40°, and the incidence angle of light at the upper corners of the rear projection television screen was 73.4°.

A mold for molding a total reflection Fresnel lens sheet was made by machining using a cutting tool having a tool angle of 38°. The Fresnel pitch was 0.1 mm, the minimum cutting radius was 280 mm, the lens angle on the minimum cutting radius was 63.1°, the maximum cutting radius was 1150 mm (effective part: 1141 mm), and the lens angle at the maximum cutting radius was 49.8°. The depth of grooves between the adjacent prisms in a specific range between a radius of 280 mm and a radius of 348 mm was increased gradually toward the center of the Fresnel lens sheet to prevent the generation of stray light rays. The depth of a groove in a central part of the lower end at a radius of 280 mm was deeper than grooves at radii not smaller than 348 mm by 0.055 mm.

A polymerizing cell having one surface defined by the total reflection Fresnel lens mold, and the other surface defined by a lenticular lens mold provided with V grooves and lenticules, was formed. A rear projection screen was formed by a thermal polymerization casting process by injecting a prepolymer of an acrylonitrile-styrene copolymer containing light-diffusing particles (refractive index after curing: 1.57) into the polymerizing cell. The grooves formed in the surface provided with the lenticules were filled up with a low-refraction resin containing light-absorbing particles to complete the rear projection screen.

COMPARATIVE EXAMPLE 1

A rear projection screen in Comparative example 1 was the same as the rear projection screen in Example 1, except that prisms in a region between a radius of 280 mm and a radius of 348 mm were formed in the same height.

COMPARISON OF EXAMPLE 1 AND COMPARATIVE EXAMPLE 1

TV sets respectively provided with the rear projection screens in Example 1 and Comparative example 1 were formed. Whereas a ghost appeared in a lower part of the rear projection screen in Comparative example 1, any ghost did not appeared in the rear projection screen in Example 1.

EXAMPLE 2

A rear projection television screen having a size of 60" (4:3) was fabricated. A light source was disposed at a projection distance of 420 mm at a level 420 mm below the level of the lower end of the rear projection television screen to form a TV set. The incidence angle of light at the middle of the lower end of the rear projection television screen was 45°, and the incidence angle of light at the upper corners of the rear projection television screen was 74°.

A mold for molding a total reflection Fresnel lens sheet was made by machining using a cutting tool having a tool angle of 38°. The Fresnel pitch was 0.1 mm. The depth of grooves between the adjacent prisms in a specific range between a radius of 420 mm and a radius of 432 mm was increased gradually and the pitch was decreased in a direction perpendicular to incident light that falls on the prisms to prevent the generation of stray light rays. The pitch in a central part of the lower end at a radius of 420 mm was 0.045 mm, and the depth of a groove in the central part of the lower end was deeper than grooves at radii not smaller than 432 mm by 0.055 mm.

A UV curable resin (refractive index after curing: 1.55) was injected into the aforesaid total reflection Fresnel lens mold, the UV curable resin was covered with a 1 mm thick acrylic base film, and the UV curable resin was irradiated with UV radiation for curing to obtain a total reflection Fresnel lens sheet.

Lenticular lenses having a trapezoidal cross section were formed on one surface of a 0.2 mm thick PET film and V grooves between the lenticular lenses having the trapezoidal cross section were filled up with a low-refraction resin containing light-absorbing particles to form a lenticular lens film. The total reflection Fresnel lens sheet, the lenticular lens film and a 1.5 mm thick acrylic base sheet were superposed in that order to form a rear projection screen.

COMPARATIVE EXAMPLE 2

A rear projection screen in Comparative example 2 was the same as the rear projection screen in Example 2, except that prisms in a region between a radius of 420 mm and a radius of 432 mm were formed in the same height and arranged at the same pitch.

COMPARISON OF EXAMPLE 2 AND COMPARATIVE EXAMPLE 2

TV sets respectively provided with the rear projection screens in Example 2 and Comparative example 2 were formed. Whereas a ghost appeared in a lower part of the rear projection screen in Comparative example 2, any ghost did not appeared in the rear projection screen in Example 2.

In the Fresnel lens sheet of the present invention, the prisms in the predetermined specific region have a height bigger than that of the prisms in the other regions or a width smaller than that of the prisms in the other regions. Thus, incident light rays which otherwise become stray light rays can be made to reach the total reflection surfaces, and thereby the generation of stray light rays can be prevented.

What is claimed is:

1. In combination, a Fresnel lens sheet and a light source, the Fresnel lens sheet having a light-receiving surface on which light emitted by the light source falls, and a light-emitting surface from which the light emitted by the light source is emitted, said Fresnel lens sheet comprising:
   a plurality of prism groups provided on the light-receiving surface, each including a plurality of prisms, each having a totally reflecting surface that reflects incident light totally toward the light-emitting surface;
   wherein the light-receiving surface is divided into a predetermined specific region on the side of the light source and another region, and
   the prisms in the predetermined specific region have a height greater than that of the prisms in another region.

2. The combination according to claim 1, wherein the prisms in the specific region have a width smaller than that of the prisms in another region.

3. In combination, a Fresnel lens sheet and a light source, the Fresnel lens sheet having a light-receiving surface on which light emitted by the light source falls, and a light-emitting surface from which the light emitted by the light source is emitted, said Fresnel lens sheet comprising:
   a plurality of prism groups provided on the light-receiving surface, each including a plurality of prisms, each having a totally reflecting surface that reflects incident light totally toward the light-emitting surface;
   wherein the light-receiving surface is divided into a predetermined specific region on the side of the light source and another region, and
   the prisms in the predetermined specific region have a width smaller than that of the prisms in another region.

4. The combination according to claim 1, wherein light rays emitted by the light source fall on the specific region of the light-receiving surface at incidence angles in the range of 35° to 45°.

5. The combination according to claim 1, wherein the height of the prisms nearer to the light source among those formed in the specific region is bigger than that of the prisms farther from the light source among those formed in the specific region.

6. The combination according to claim 2, wherein the width of the prisms nearer to the light source among those formed in the specific region is smaller than that of the prisms farther from the light source among those formed in the specific region.

7. The combination according to claim 1, wherein the prisms have the same apex angle.

8. The combination according to claim 1, wherein the prisms have the same width.

9. The combination according to claim 3, wherein the prisms have the same height.

10. The combination according to claim 2, wherein the height of the prisms nearer to the light source among those formed in the specific region is greater than that of the prisms farther from the light source among those formed in the specific region, and the width of the prisms nearer to the light source among those formed in the specific region is smaller than that of the prisms farther from the light source among those formed in the specific region.

11. A rear projection screen comprising a Fresnel lens sheet having a light-receiving surface on which light emitted by a light source falls, and a light-emitting surface from which the light emitted by the light source is emitted;
   wherein a plurality of prism groups provided on the light-receiving surface, each including a plurality of prisms, each having a totally reflecting surface that reflects incident light totally toward the light-emitting surface are formed in the light-receiving surface,
   the light-receiving surface is divided into a predetermined specific region on the side of the light source and another region, and
   the prisms in the predetermined specific region have a height greater than that of the prisms in another region.

12. A rear projection screen comprising a light source, a Fresnel lens sheet having a light-receiving surface on which light emitted by the light source falls, and a light-emitting surface from which the light emitted by the light source is emitted;
   wherein a plurality of prism groups provided on the light-receiving surface, each including a plurality of prisms each having a totally reflecting surface that reflects incident light totally toward the light-emitting surface are formed in the light-receiving surface,
   the light-receiving surface is divided into a predetermined specific region on the side of the light source and another region, and
   the prisms in the predetermined specific region have a width smaller than that of the prisms in another region.

13. The rear projection screen according to claim 11, wherein
   the prisms formed in the predetermined specific region have a width smaller than that of the prisms formed in another region.

* * * * *